United States Patent [19]

Okamura et al.

[11] Patent Number: 5,646,641
[45] Date of Patent: Jul. 8, 1997

[54] IMAGE DISPLAY APPARATUS

[75] Inventors: Toshiro Okamura, Hino; Naoto Shimada, Hachioji, both of Japan

[73] Assignee: Olympus Optical Co., Ltd., Tokyo, Japan

[21] Appl. No.: 633,700

[22] Filed: Apr. 19, 1996

Related U.S. Application Data

[63] Continuation of Ser. No. 267,908, Jul. 6, 1994, abandoned.

[30] Foreign Application Priority Data

Jul. 6, 1993 [JP] Japan ............................ 5-166709

[51] Int. Cl.$^6$ .............................. G09G 5/00; G09G 3/36
[52] U.S. Cl. ..................... 345/8; 345/96; 345/209
[58] Field of Search ............................ 345/7, 8, 96, 209; 348/51–53, 57; 434/43; H04N 13/00, 13/02, 13/04, 15/00

[56] References Cited

U.S. PATENT DOCUMENTS

| | | | |
|---|---|---|---|
| 4,737,972 | 4/1988 | Schoolman | 345/8 X |
| 4,834,503 | 5/1989 | Tsujimoto et al. | 345/96 X |
| 4,926,168 | 5/1990 | Yamamoto et al. | 345/96 |
| 4,982,183 | 1/1991 | Flegal et al. | 345/209 |
| 5,034,809 | 7/1991 | Katoh . | |
| 5,107,353 | 4/1992 | Okumura | 345/96 X |
| 5,122,790 | 6/1992 | Yasuda et al. | 345/96 |
| 5,281,957 | 1/1994 | Schoolman | 345/8 |

FOREIGN PATENT DOCUMENTS 461495A 2/1992 Japan .

*Primary Examiner*—Richard Hjerpe
*Assistant Examiner*—Kara Farnandez Stoll
*Attorney, Agent, or Firm*—Watson Cole Stevens Davis, P.L.L.C.

[57] ABSTRACT

In an image display apparatus of a head-mounted type including right-eye image display LCD for displaying a right-eye image, left-eye image display LCD for displaying a left-eye image, right-eye optical system for projecting the right-eye image onto a right-eye of a user, left-eye optical system for projecting the left-eye image onto a left-eye of the user, a polarity of each of the image signals supplied to the right-eye and left-eye image display LCDs is reversed such that each of pixels of these LCDs is driven in an alternating current mode so that the fluctuation in the intensity of the displayed images and the deterioration of the LCDs can be mitigated.

8 Claims, 7 Drawing Sheets

FIG_1
PRIOR ART

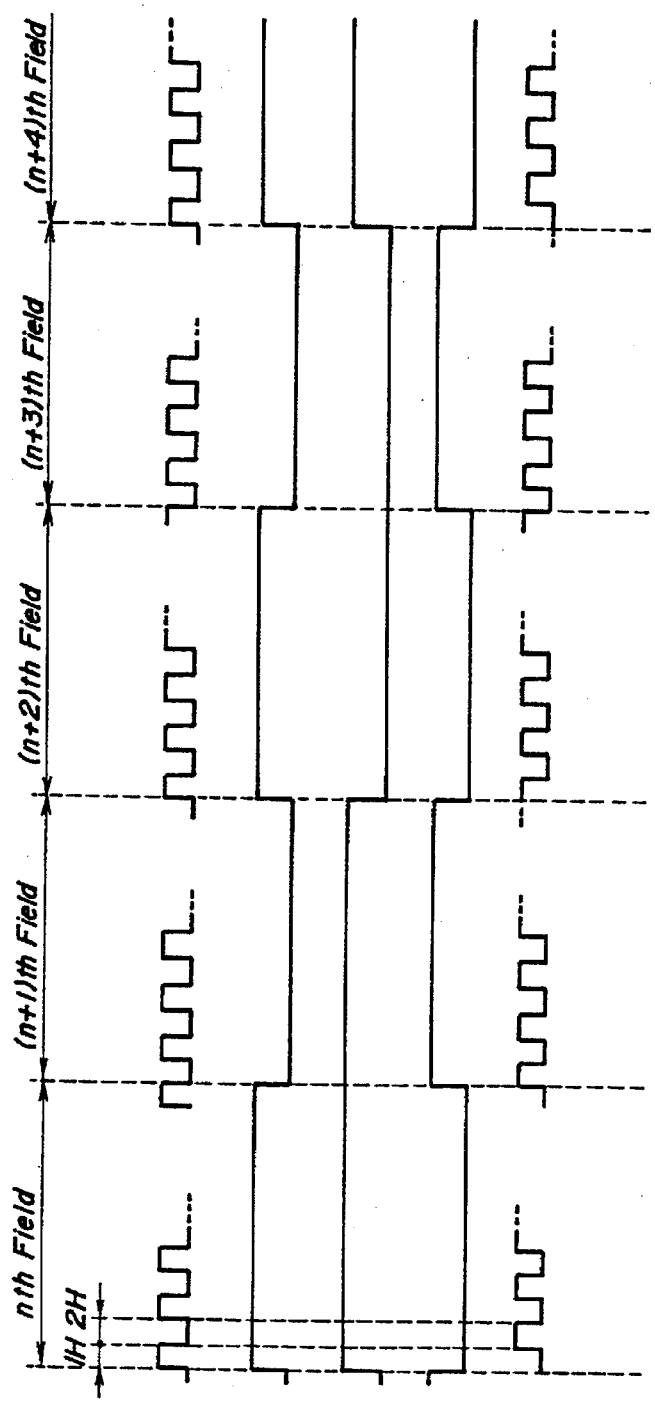

FIG_7
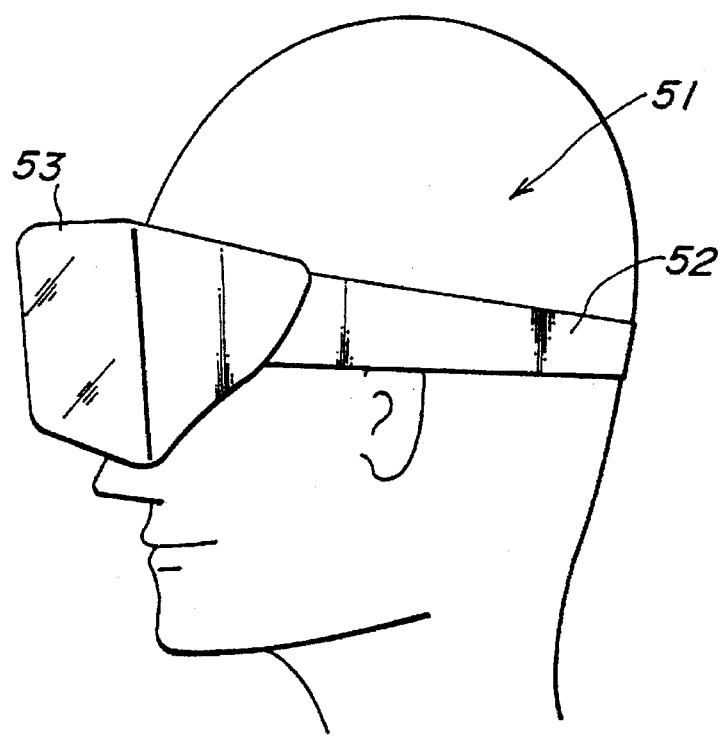
FIG_8
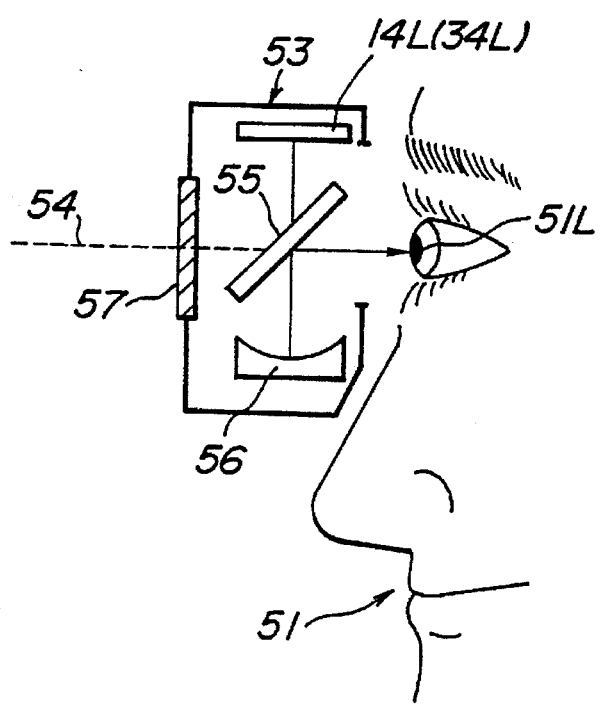

Н,646,641

IMAGE DISPLAY APPARATUS

This application is a continuation of application Ser. No. 08/267,908, filed Jul. 6, 1994 (abandoned).

BACKGROUND OF THE INVENTION

1. Field of the Invention

The present invention relates to an image display apparatus, particularly a face- or head-mounted type image display apparatus comprising a right-eye image display device for displaying a right-eye image which is exclusively seen by a right-eye of a user and a left-eye image display device for displaying a left-eye image which is exclusively seen by a left eye of the user.

2. Description of Related Art

In Japanese Patent Application Laid-open Publication Kokai Hei 4-61495, there is described an image display apparatus of a kind mentioned in the preamble. FIG. 1 is a block diagram showing this known image display apparatus. The image display apparatus comprises right-eye image displaying circuit 1R, left-eye image displaying circuit 1L and switching circuit 2. The switching circuit 2 is driven in synchronism with a field synchronizing signal to divide an input image signal into first or odd field signals and second or even field signals. These odd and even field signals are supplied to right-eye and left-eye image displaying circuits 1R and 1L alternately.

The right-eye image displaying circuit 1R comprises amplification and separation circuit 3R for amplifying the odd field image signal and extracting a synchronizing signal therefrom, color demodulating circuit 4R, liquid crystal display module (LCD) 5R, horizontal and vertical timing circuit 6R, back-light 7R and back-light driving circuit 8R. The odd field image signal supplied from the switching circuit 2 is first amplified by the amplifying and synchronizing signal separating circuit 3R and then a synchronizing signal is extracted from the odd field image signal. The image signal is then supplied to the color demodulating circuit 4R to produce red, green and blue color signals R, G, B. These color signals are supplied to the LCD 5R. The synchronizing signal is supplied to the horizontal and vertical timing circuit 6R, and a scanning signal and a timing signal are generated. These signals are supplied to the LCD 5R to display the right-eye image thereon. The back-light 7R is driven by the back-light driving circuit 8R to illuminate the LCD 5R from its back.

Similarly, the left-eye image displaying circuit 1L comprises image amplifying and synchronizing signal separating circuit 3L, color demodulating circuit 4L, liquid crystal module (LCD) 5L, horizontal and vertical timing circuit 6L, back light 7L and back light driving circuit 8L, and the left-eye image is displayed on the LCD 5L.

Since the head-mounted type image display apparatus has to be small in size and light in weight, the image display device is formed by a liquid crystal display (LCD). When a DC voltage is applied to the LCD of TFT (Thin Film Transistor) type for a relatively long time, there is produced an electrical and chemical change within the LCD, so that characteristics of LCD might be deteriorated to a large extent. Therefore, in general, the LCD is driven by the image signal whose polarity is opposite to that of preceding fields by reversing the polarity of the image signal for every other field. Particularly, in case of displaying an interlaced image signal such as an NTSC signal on a small liquid crystal display having a size of 400×250 pixels, the same pixel is used for both the odd and even fields and the polarity of the image signal supplied to respective pixels is changed for successive fields. In this manner, the liquid crystal display is driven in an alternating current mode.

However, the LCD has such characteristics that an intensity of a displayed image is changed or fluctuated in accordance with a polarity of the image signal owing to the reason that a waveform of a voltage applied to the LCD is not symmetrical although the polarity of the image signal is reversed. Therefore, when the polarity of the image signal of successive fields is made opposite to that of preceding fields by reversing the polarity of the image signal for every other field, the intensity of the displayed image is changed in a rhythm of the field to produce a flicker.

In order to mitigate the above mentioned problem, there has been proposed to average the flicker by changing the polarity of the image signal for successive lines as shown in FIG. 2. By this measure, the flicker becomes imperceptible. If this solution is applied to the known image display apparatus shown in FIG. 1 and the polarity of the image signal is reversed for every other line, the image signal of an odd field is supplied to the right-eye display device 1R and the image signal of an even field is supplied to the left-eye image displaying circuit 1L. In this manner, the odd field images are displayed on LCD 5R and the even field images are displayed on LCD 5L. In this case, even if the polarity of the image signal is made opposite to that of preceding lines, the image signal having the same polarity is always supplied to pixels on the same line of LCDs 5R and 5L. Therefore, in each of the odd and even fields, the intensity of odd lines and that of the even lines are different from each other and respective lines of LCDs 5R and 5L are always driven by the image signal having the same polarity, and thus the life-time of LCDs 5R and 5L might be shortened.

SUMMARY OF THE INVENTION

The present invention has for its object to provide a novel and useful image display apparatus, in which unevenness in the intensity of the displayed images can be mitigated and the deterioration of the liquid crystal display elements can be effectively avoided.

According to the invention, an image display apparatus comprises:

a right-eye image display device for displaying a right-eye image which is exclusively seen by a right-eye of a user;

a left-eye image display device for displaying a left-eye image which is exclusively seen by a left-eye of the user; and a means for reversing polarities of image signals supplied to said right-eye and left-eye image display devices at suitable timings such that respective pixels of the right-eye and left-eye images displayed on said right-eye and left-eye display devices are driven in an alternating current mode.

According to further aspect of the invention, an image display apparatus comprises:

a first image display device including a number of pixels arranged in matrix and displaying a first image which is exclusively seen by a right-eye of a user;

a second image display device including a number of pixels arranged in matrix and displaying a second image which is exclusively seen by a left-eye of the user;

means for supplying first and second image signals to said first and second image display devices, respectively, said first and second image signals being synchronized with each other; and means for reversing the polarity of each of first and second image signals in synchronism with the field.

According to further aspect of the present invention, an image display apparatus comprises:

a first image display device including a number of pixels arranged in matrix and displaying a first image which is exclusively seen by a right-eye of a user;

a second image display device including a number of pixels arranged in matrix and displaying a second image which is exclusively seen by a left-eye of the user;

a means for dividing an input image signal into first and second image signals which are supplied to said first and second image display means, respectively;

a first polarity reverse signal generating means for generating a first polarity reverse signal for reversing a polarity of said image signal for every other line;

a second polarity reverse signal generating means for generating a second polarity reverse signal for reversing the polarity of the image signal in synchronism with fields; and a means for reversing the polarity of the input image signal in accordance with said first and second polarity reverse signals.

According to further aspect of the present invention, an image display apparatus comprises:

a first image display device including a number of pixels arranged in matrix and displaying a first image which is exclusively seen by a right-eye of a user;

a second image display device including a number of pixels arranged in matrix and displaying a second image which is exclusively seen by a left-eye of the user;

a first polarity reverse signal generating means for generating a first polarity reverse signal for reversing the polarity of the first image signal for every other line;

a second polarity reverse signal generating means for generating a second polarity reverse signal for reversing the polarity of the second image signal for every other line;

a third polarity reverse signal generating means for generating a third polarity reverse signal for reversing the polarity of the first image signal in synchronism with fields;

a fourth polarity reverse signal generating means for generating a fourth polarity reverse signal for reversing the polarity of the second image signal in synchronism with fields;

a first polarity reversing means for reversing the polarity of the first image signal in accordance with said first and third polarity reversing signal; and a second polarity reversing means for reversing the polarity of the second image signal in accordance with said second and fourth polarity reversing signal.

In the image display apparatus according to the invention, the input image signal is divided into the first and second image signals and these first and second image signals are supplied to the first and second image display means, respectively for displaying first and second images which are exclusively seen by the right-eye and left-eye of the user, while the polarity of each of the first and second image signals is reversed at suitable timings such that the pixels of these right-eye and left-eye image display means can be driven in an alternating current mode. Therefore, the unevenness of the intensity of the first and second images can be avoided effectively. Moreover, the deterioration of the pixels can be prevented.

BRIEF DESCRIPTION OF THE DRAWINGS

FIGS. 6a to 6e are signal waveforms for explaining the operation of the apparatus of FIG. 5;

FIG. 7 is a perspective view showing the image display apparatus according to the invention constructed as the head-mounted display; and FIG. 8 is a schematic view illustrating the main body constructed as the head-mounted type display.

DESCRIPTION OF THE PREFERRED EMBODIMENTS

Figure 1:
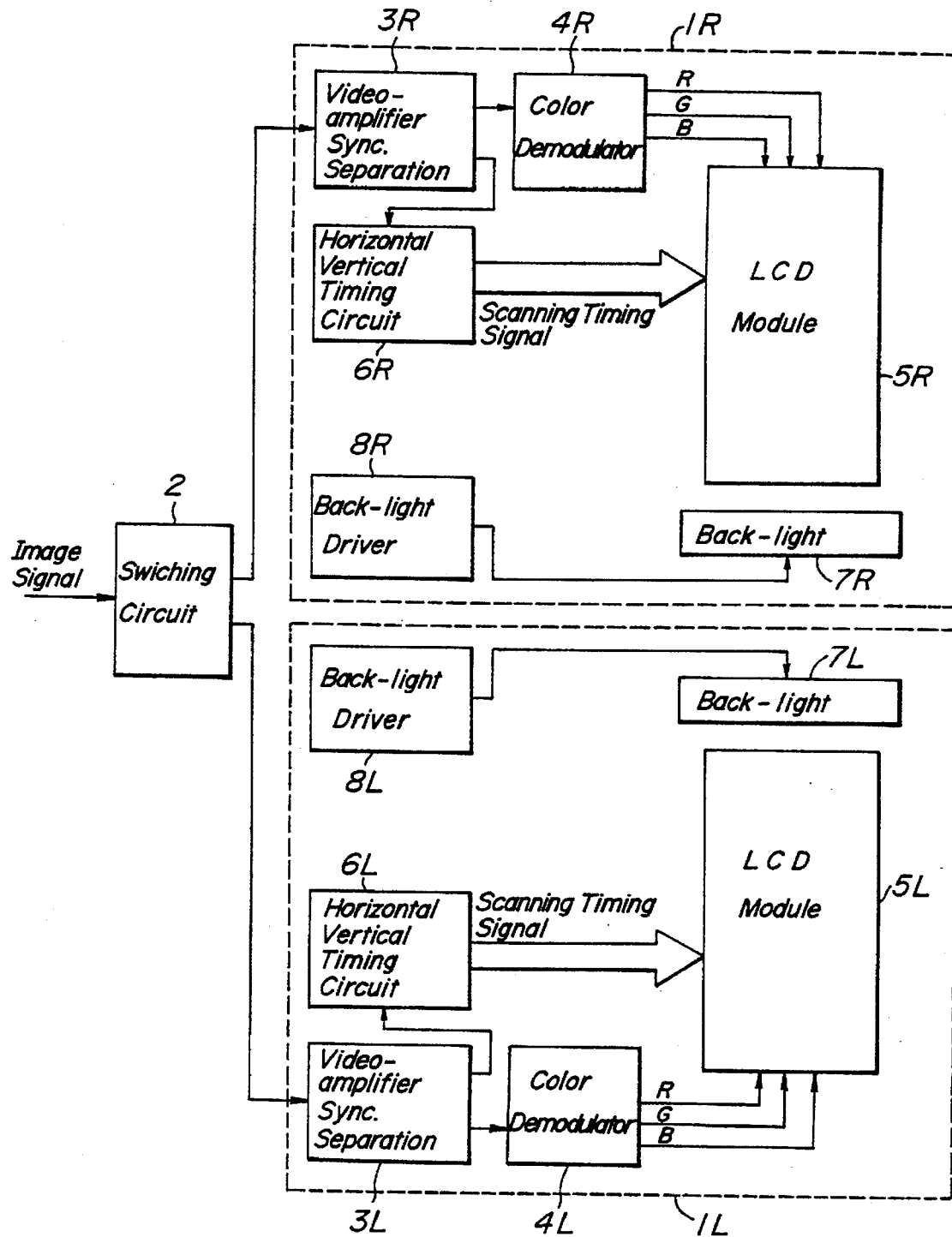
FIG. 1 is a block diagram showing a known image display apparatus including right-eye and left-eye image display devices.
Figure 2:
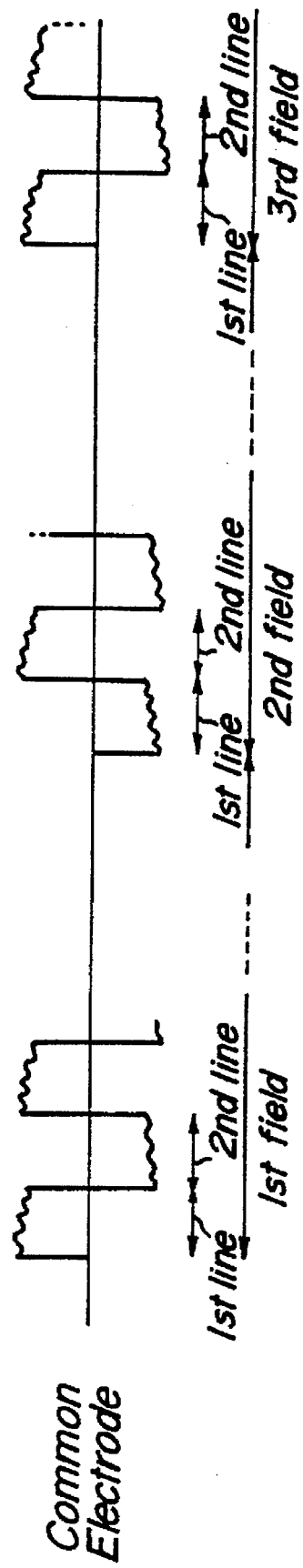
FIG. 2 is a waveform of the image signal.
Figure 3:
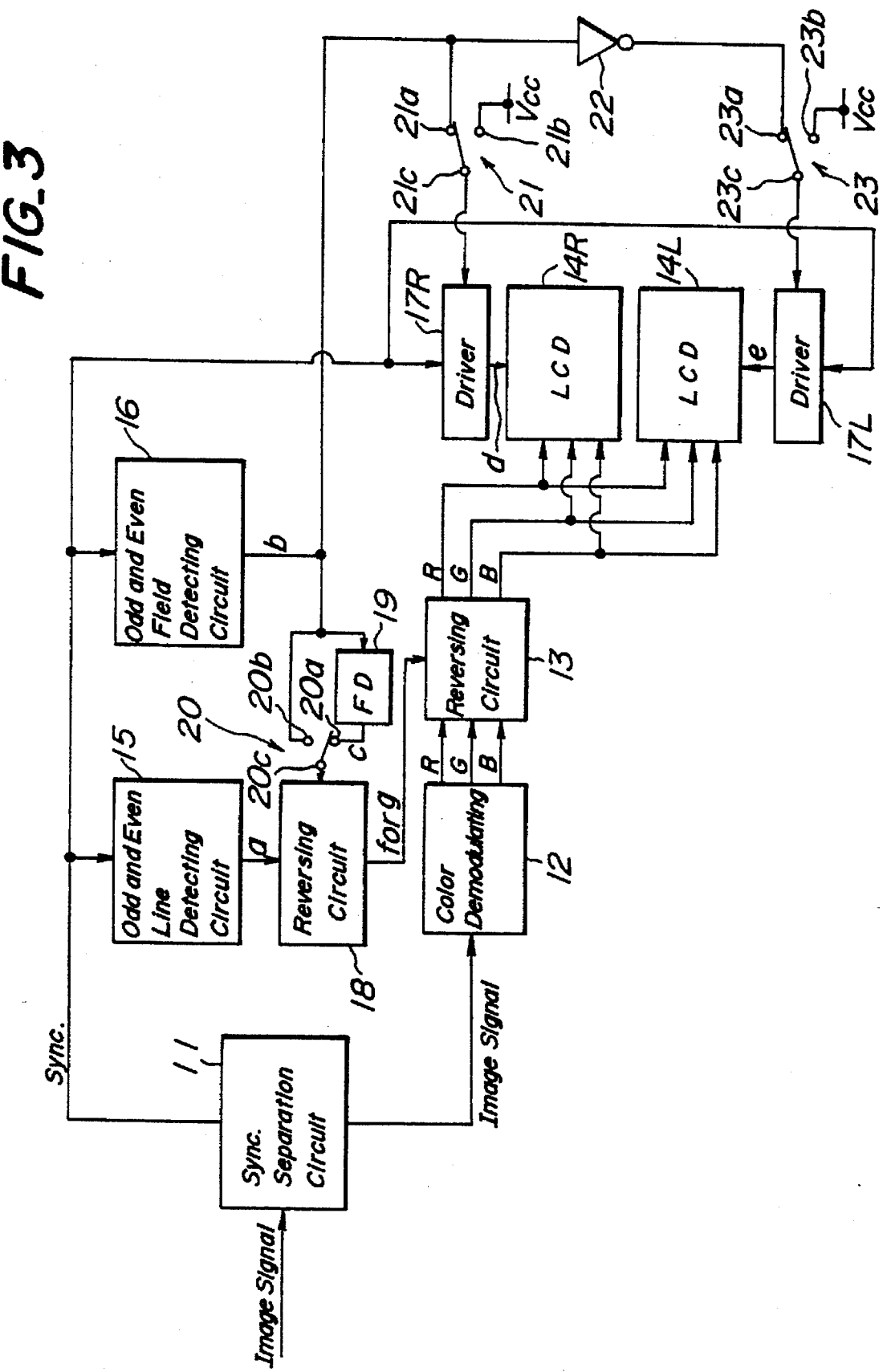
FIG. 3 is a block diagram illustrating a first embodiment of the image display apparatus according to the invention.

FIG. 3 is a block diagram illustrating the construction of a first embodiment of the image display apparatus according to the invention. In the present embodiment, an input image signal is supplied to a synchronization signal separating circuit 11, and is divided into an image signal and a synchronizing signal. The image signal derived from the synchronizing signal separating circuit 11 is supplied to a color demodulating circuit 12 to demodulate red, green and blue color signals R, G and B. These color signals are then supplied via a polarity reversing circuit 13 to liquid crystal display devices 14R and 14L for displaying right-eye and left-eye images, respectively to be exclusively seen by right-eye and left-eye of a user, respectively. The polarity reversing circuit 13 receives a control signal and functions to reverse the polarity of the color signals R, G and B when the control signal has a logic high level H, but does not reverse the polarity when the control signal is at a logic low level L.

Figure 4:
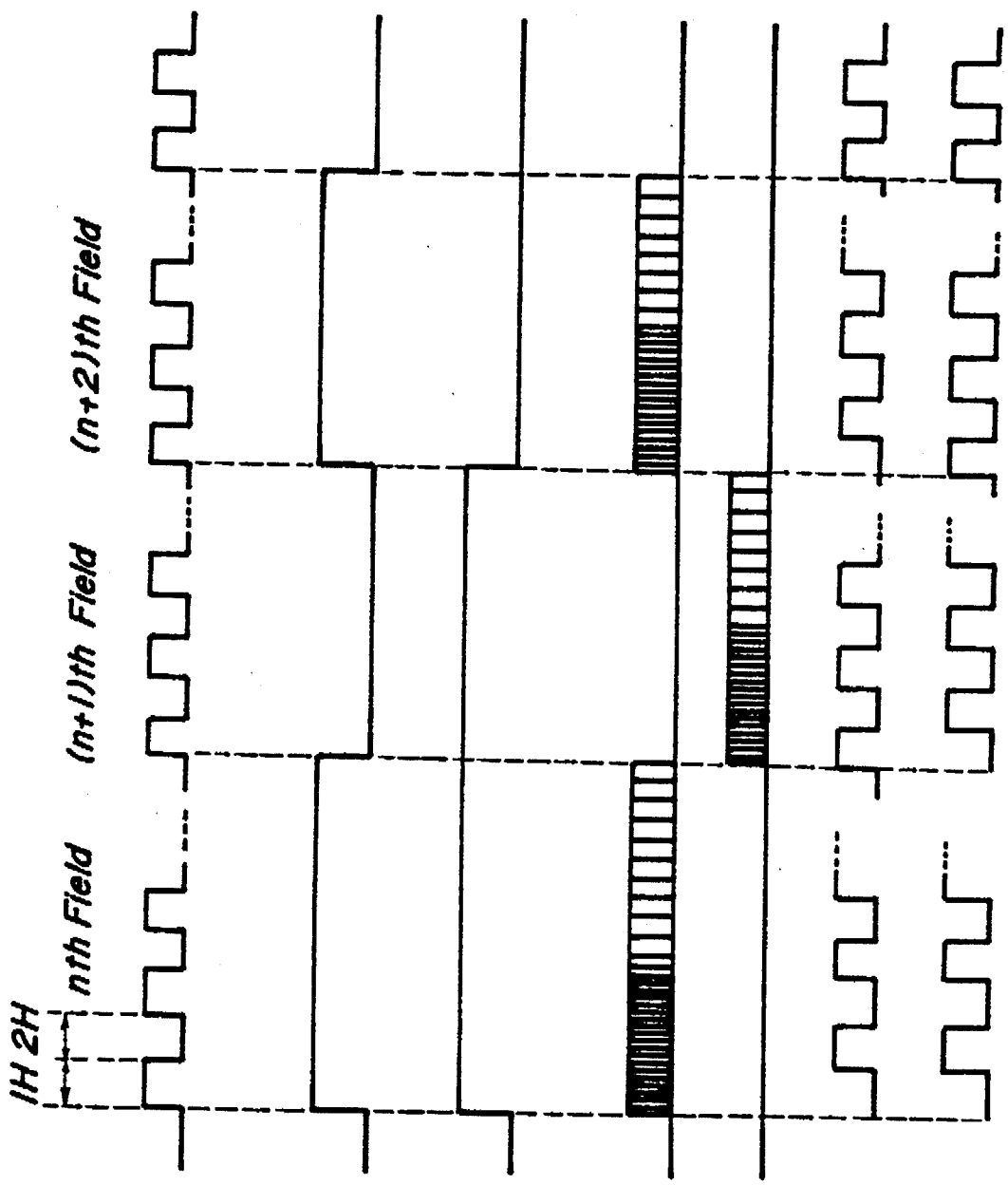
FIGS. 4a to 4g are signal waveforms for explaining the operation of the image display apparatus shown in FIG. 3.

The synchronizing signal derived by the circuit 11 is supplied to an odd and even line detecting circuit 15 as well as to an odd and even field detecting circuit 16. The synchronizing signal is further supplied to drivers 17R and 17L for driving the LCDs 14R and 14L, respectively. In the odd and even line detecting circuit 15, odd lines and even lines in a field are detected to generate an output signal which becomes H level in odd lines and assumes L level in even lines as depicted in FIG. 4a. This output signal is supplied to the control input of the polarity reversing circuit 13 via a polarity reversing circuit 18.

In the odd and even field judging circuit 16, odd and even fields are detected to produce an output signal which has H level for odd fields and becomes L for even fields as illustrated in FIG. 4b. This output signal is supplied to one input of a switch 20 via a frequency divider 19 and to the other input of the switch 20 directly. The frequency divider 19 serves to increase the period of the output signal of the odd and even field judging circuit 16 by two times as depicted in FIG. 4c. The output signal of the odd and even field detecting circuit 16 is further supplied to one input terminal 21a of a switch 21 and to one input terminal 23a of a switch 23 via an inverter 22.

A switching arm terminal 20c of the switch 20 is connected to the control terminal of the polarity reversing circuit 18. When the signal at the control terminal of the polarity reversing circuit 18 is at H level, the polarity of the output of the odd and even line detecting circuit 15 is reversed and is supplied to the control terminal of the polarity reversing circuit 13, but when the signal at the control terminal of the circuit 18 is at L level, the output of the odd and even line detecting circuit 15 is supplied to the control terminal of the polarity reversing circuit 13 as it is. To the other input terminals of the switches 21 and 23 are applied a reference voltage Vcc, and switching arm terminals 21c and 23c of these switches 21 and 23 are connected to enable terminals of the drivers 17R and 17L, respectively. The drivers 17R and 17L are operated when the signal applied to the enable terminal is at H level.

In the present embodiment, when the input image signal is of an ordinary two-dimensional image, the switching arms of the switches 20, 21 and 23 are connected to the terminals 20b, 21b and 23b, respectively. In this case, to the enable terminals of the drivers 17R and 17L there are applied the reference voltage Vcc, so that the reversing circuit 18 reverses the polarity of the output signal from the odd and even line detecting circuit 15 in accordance with the output signal of the odd and even field detecting circuit 16 as shown by FIG. 4f. Therefore, the polarity of the color signals R, G and B supplied to LCDs 14R and 14L is reversed for successive lines as well as for odd and even fields. In this manner, the LCDs 14R and 14L display the entirely same images.

When the input image signal is of a three-dimensional or stereoscopic image, the switching arms of the switches 20, 21 and 23 are connected to the terminals 20a, 21a and 23a, respectively. Then, the enable terminal of the driver 17R for the LCD 14R becomes H level for odd fields and the enable terminal of the driver 17L for the LCD 14L becomes L for even fields, so that the LCD 14R is driven by driving signal or pulses (gate pulses) supplied from the driver 17R during the odd field period and corresponding to successive pixels on successive lines as shown in FIG. 4d and the LCD 14L is driven by the driving pulses supplied from the driver 17L during the even field period as illustrated in FIG. 4e.

The output signal of the odd and even line detecting circuit 15 is reversed by the reversing circuit 18 in accordance with the output signal from the frequency divider 19 as depicted in FIG. 4g. Therefore, during the even field period, the polarity of the color signals R, G and B supplied to the same line of LCD 14L is reversed for successive fields. Thus, also in this case, the LCDs 14R and 14L are driven in the alternating current mode.

Figure 5:
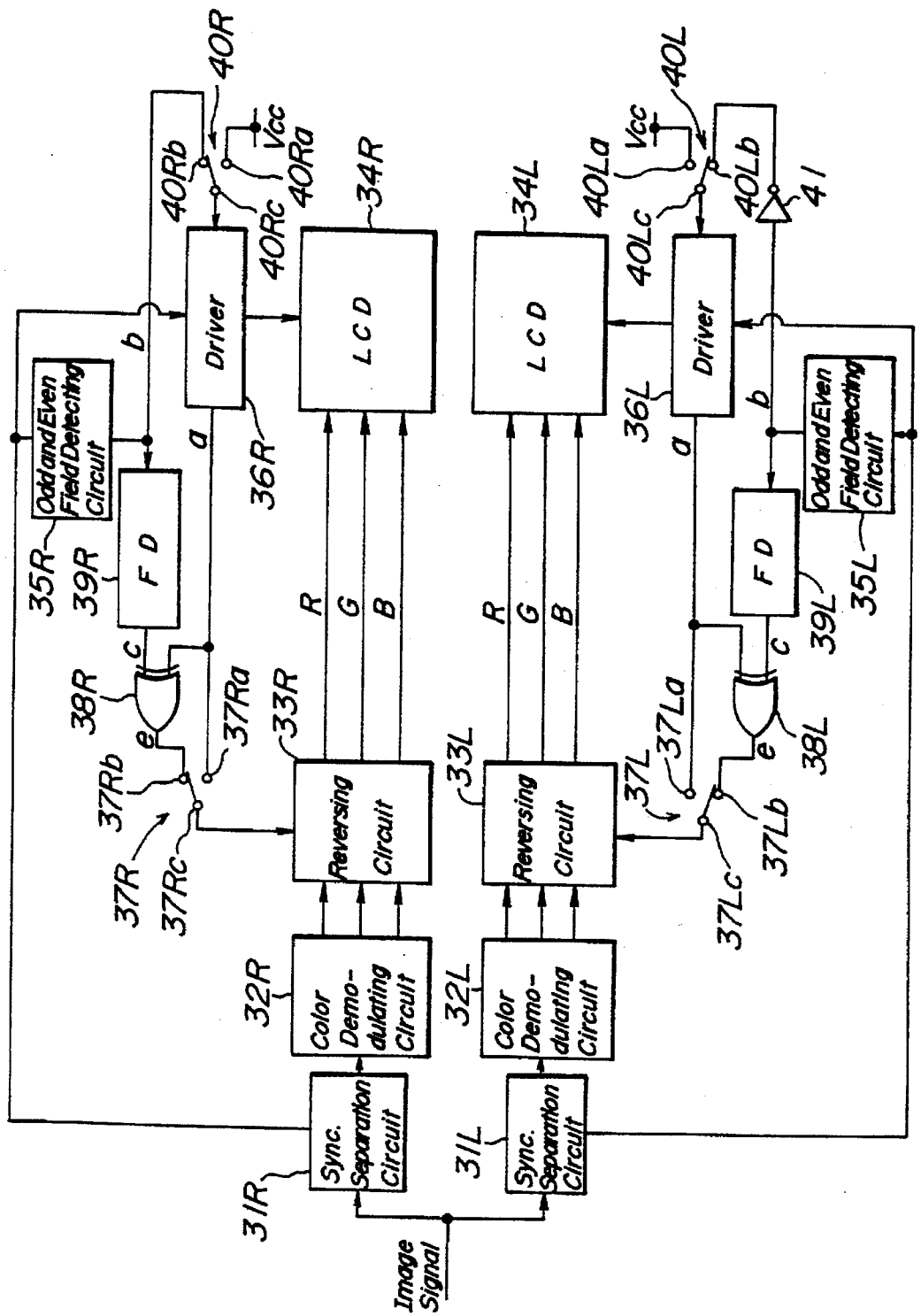
FIG. 5 is a block diagram depicting a second embodiment of the image display apparatus according to the invention.

FIG. 5 is a block diagram illustrating a second embodiment of the image display apparatus according to the invention. In the present embodiment, there are provided right-eye and left-eye driving circuits and the input image signal is processed independently by these driving circuits. That is, the input image signal is first divided into first and second image signals. Then, the first image signal is supplied a first synchronizing signal separating circuit 31R to derive a synchronizing signal. The first image signal having the synchronizing signal removed therefrom is supplied to a first color demodulating circuit 32R to generate red, green and blue color signals R, G and B, and these color signals are supplied via a first polarity reversing circuit 33R to a first liquid crystal display 34R for displaying a first image which is exclusively seen by a right-eye of a user. The polarity reversing circuit 33R serves to reverse the polarity of the color signals R, G and B only when a control signal supplied to its control terminal has a logic H level.

The synchronizing signal derived from the separating circuit 31R is supplied to a first odd and even field detecting circuit 35R as well as to a first driver 36R. The first driver 36R generates the control signal (FIG. 6(a)) on the basis of the synchronizing signal, said control signal controlling the reverse and non-reverse of the polarity of the color signals for successive lines as shown in FIG. 6a. When the enable terminal assumes a H level, it produces gate pulses (FIG. 6(d)) for driving successive pixels on successive lines of the LCD 34R. The control signal (FIG. 6(a)) generated by the first driver 36R is supplied to one input terminal 37Ra of a switch 37R as well as to one input terminal of an exclusive OR circuit 38R.

In the odd and even field detecting circuit 35R, the odd and even fields are discriminated from each other and produces an output signal which has H level for odd fields and L level for even fields. This output signal is supplied to a first frequency divider 39R as well as to one input terminal 40Rb of a second switch 40R. As illustrated in FIG. 6c, the first frequency divider 39R functions to double the frequency of the input signal, which is then supplied to the other input terminal of the exclusive OR circuit 38R.

An output signal of the exclusive OR circuit 38R is supplied to the other input terminal 37Rb of the first switch 37R and a switching arm terminal 37Rc of this switch is connected to the control terminal of the first polarity reversing circuit 33R. To the other input 40Ra of the switch 40R is applied H level voltage, i.e. Vcc. A switching arm terminal 40Rc of the switch 40R is connected to the enable terminal of the first driver 36R.

A driving circuit for driving a second LCD 34L for displaying a second image which is exclusively seen by the left-eye of the user is constructed similarly to the above mentioned driving circuit for the LCD 34R. That is to say, there are provided second synchronizing signal separating circuit 31L, second color demodulating circuit 33L, second polarity reversing circuit 33L, second odd and even field detecting circuit 35L, second driver 36L, switch 37L, second exclusive OR circuit 38L and second frequency divider 39L. The output signal from the second odd and even field detecting circuit 35L is supplied to the terminal 40Lb of the switch 40L by means of an inverter 41. Therefore, the polarity of the output signal (FIG. 6b) of the second odd and even field detecting circuit 35L is reversed as shown in FIG. 6d.

In the present embodiment, when the input image signal is of the ordinary two-dimensional image, the switching arm contacts 37Rc, 37Lc, 40Rc and 40Lc are connected to the terminals 37Ra, 37La, 40Ra and 40La, respectively. In this case, Vcc is applied to the enable terminals of the first and second drivers 36R and 36L, and thus the polarity of the color signals supplied to the LCDs 34R and 34L is reversed for every line as well as for odd and even fields. In this manner, the entirely same images are displayed on these LCDs 34R and 34L.

When the three-dimensional image is supplied to the input terminal, the movable arm terminals 37Rc, 37Lc, 40Rc and 40Lc are connected to the input terminals 37Rb, 37Lb, 40Rb and 40Lb. In this case, the enable terminal of the first driver 36R for the first LCD 34R assumes H level during odd fields and the enable terminal of the second driver 36L for the second LCD 34L becomes H level during even fields.

To the control terminals of the reversing circuits 33R and 33L there are supplied output signals from the exclusive OR circuits 38R and 38L, respectively. As shown in FIG. 6e, the output signal of the first exclusive OR circuit 38R is an exclusive logic sum of the output of the first frequency divider 39R (FIG. 7c) and the control signal from the first driver 36R (FIG. 7a), and similarly the output signal of the second exclusive OR circuit 38R is an exclusive logic sum of the output of the second frequency divider 39R (FIG. 7c) and the control signal from the second driver 36R (FIG. 7a). Therefore, to the first LCD 34R, there is supplied the image signal of odd fields and the polarity of the image signal on the same line is reversed for successive odd fields. To the second LCD 34L there is supplied the image signal of even fields is supplied and the polarity of this image signal on the same line is reversed for successive even fields. In this manner, each of the first and second LCDs 34R and 34L is driven in the alternating current mode.

It should be noted that in the present embodiment there are provided the first and second display driving circuits separately from each other, so that this embodiment can be used for such a case that right-eye and left-eye image signals of the three-dimensional image are supplied simultaneously.

The embodiments so far explained may be constructed as a head-mounted type display apparatus. As shown in FIG. 7, a main body 53 of the head-mounted type display apparatus is mounted on a head 51 of a user with the aid of a band 52. In this head-mounted type display apparatus, there are provided right-eye and left-eye optical systems for observing the right-eye and left-eye images formed on the right-eye and left-eye LCDs by the right-eye and left-eye of the user respectively.

As illustrated in FIG. 8, the left-eye image formed on the left-eye LCD 14L (FIG. 3) or LCD 34L (FIG. 5) is projected onto a concave mirror 56 by means of a half mirror 55 which is arranged to be inclined by 45 degrees with respect to an optical axis as well as to a viewing axis 54 of the left-eye 51L of the user. In this manner, an enlarged virtual image is formed and then this image is projected onto the left-eye 51L substantially along the viewing axis 54 by means of the half mirror 55. There is further arranged a liquid crystal shutter 57 at a position on the viewing axis 54. Therefore, when the liquid crystal shutter 57 is closed, the the user can see only the image displayed on the LCD 14L or 34L, but when the shutter 57 is opened, the user can also see the image of the surroundings. In this case, when the display of the image on the LCD is interrupted or is restricted into a small area in response to the opening of the shutter 57, the user can see the surroundings without being affected by the displayed image. It should be noted that the optical system for the right-eye may be constructed in the same manner as the optical system for the left-eye.

The circuit elements except for the LCDs shown in FIGS. 3 and 5 may be provided in the main body 53 of the head-mounted type display apparatus or a control unit which is provided separately from the main body 53 and may be carried by the user. Usually, various control members such as power switch and volume are provided on the control unit.

As explained above, according to the invention, the polarity of the image signals supplied to the right-eye and left-eye image display devices is reversed at suitable timings, and thus the intensity of the displayed images becomes uniform and the deterioration of pixels of the image display devices can be avoided effectively.

The present invention is not limited to the embodiments explained above, but many modifications and alternations may be conceived by those skilled in the art within the scope of the invention. For instance, in the above embodiments, the polarity of the image signal is reversed every field or every other field, but according to the invention, the polarity of the image signal may be reversed in various manners. For instance, the polarity of the image signal may be reversed every third fields. Furthermore, according to the invention, the polarity of the image signal to be supplied to each of the right-eye and left-eye image display devices may be reversed at random as long as each pixel of the display devices can be driven in the alternating current mode such that the displayed image has a uniform intensity and the deterioration of pixels can be prevented.

What is claimed is:

1. An image display apparatus comprising:
   a right-eye image display device for displaying a first image which is exclusively seen by a right-eye of a user;
   a left-eye image display device for displaying a second image which is exclusively seen by a left-eye of the user;
   a means for reversing polarities of image signals supplied to said right-eye and left-eye image display devices at suitable timings such that respective pixels of the first and second images displayed on said right-eye and left-eye display devices are driven in an alternating current mode, wherein said means for reversing the polarity of the image signals comprises first means for reversing the polarity of the image signal on the same line for successive fields and second means for reversing the polarity of the image signal on the same line for every other field; and
   a switch means for switching between operation of the first and second means.

2. An apparatus according to claim 1, wherein said polarity reversing means comprises an exclusive OR circuit.

3. An image display apparatus comprising:
   a first image display device including a number of pixels arranged in matrix and displaying a first image which is exclusively seen by a right-eye of a user;
   a second image display device including a number of pixels arranged in matrix and displaying a second image which is exclusively seen by a left-eye of the user;
   signal line means comprising a single image signal line portion and a branched portion at which said single image signal line portion is branched into two divided image signal lines, wherein input image signals supplied through said single image signal line portion are supplied to the first and second image display devices through said divided image signal lines respectively; and
   polarity reversing means for reversing the polarity of each of said input image signals supplied to the first and second image display devices in synchronism with the field of said input image signal, wherein said polarity reversing means comprises a first means for reversing the polarity of the image signal on the same line for successive fields of said input image signal and a second means for reversing the polarity of the image signal on the same line for every other field of said input image signal; and
   a switch means for switching between operation of the first and second means.

4. An apparatus according to claim 3, wherein said polarity reversing means is constructed such that the polarity of the image signal is reversed every line during each field.

5. An image display apparatus comprising;

a first image display device including a number of pixels arranged in matrix and displaying a first image which is exclusively seen by a right-eye of a user;

a second image display device including a number of pixels arranged in matrix and displaying a second image which is exclusively seen by a left-eye of the user;

signal line means comprising a single image signal line portion and a branched portion at which said single image signal line portion is divided into two divided image signal lines, wherein input image signals supplied through said single image signal line portion are supplied to the first and second image display devices through said divided image signal lines respectively;

a first polarity reverse signal generating means for generating a first polarity reverse signal for reversing a polarity of said input image signals for every other line;

a second polarity reverse signal generating means for generating a second polarity reverse signal for reversing the polarity of the input image signals in synchronism with fields; and a means for reversing the polarity of the input image signals in accordance with said first and second polarity reverse signals, wherein:

said second polarity reverse signal generating means generates, as the second polarity reversing signal, either one of a signal for reversing the polarity of the input image signals in successive fields and a signal for reversing the polarity of the input image signals in every other field.

6. An apparatus according to claim 5, further comprising a means for driving each of said first and second image display devices into a condition in which a display of an image is allowed and a condition in which a display of an image is inhibited.

7. An image display apparatus comprising:

a first image display device including a number of pixels arranged in matrix and displaying a first image which is exclusively seen by a right-eye of a user;

a second image display device including a number of pixels arranged in matrix and displaying a second image which is exclusively seen by a left-eye of the user;

signal line means comprising a single image signal line portion and a branched portion at which said single image signal line portion is divided into two image divided signal lines, wherein an input image signal supplied through said single image signal line portion is supplied to the first and second image display devices through said divided image signal lines respectively;

a first polarity reverse signal generating means for generating a first polarity reverse signal for reversing the polarity of a first image signal supplied, via one of said divided image signal lines, to said first image display device for every other line;

a second polarity reverse signal generating means for generating a second polarity reverse signal for reversing the polarity of a second image signal supplied, via one of said divided image signal lines, to said second image display device for every other line;

a third polarity reverse signal generating means for generating a third polarity reverse signal for reversing the polarity of the first image signal in synchronism with fields;

a fourth polarity reverse signal generating means for generating a fourth polarity reverse signal for reversing the polarity of the second image signal in synchronism with fields;

a first polarity reversing means for reversing the polarity of the first image signal in accordance with said first and third polarity reverse signals; and a second polarity reversing means for reversing the polarity of the second image signal in accordance with said second and fourth polarity reverse signals, wherein:

when said input image signal is a three-dimensional image signal which comprises said first image signal and said second image signal in successive fields, each of said third and fourth polarity reverse signal generating means generates a polarity reverse signal for reversing the polarity of the first and second image signals for every two fields, and when said input image signal is not a three-dimensional image signal, each of said third and fourth polarity reverse signal generating means generates a polarity reverse signal for reversing the polarity of the first and second image signals for every field.

8. An apparatus according to claim 7, further comprising a means for driving each of said first and second image display devices into a condition in which a display of an image is allowed and a condition in which a display of an image is inhibited.

* * * * *